United States Patent
Arkhipov et al.

(10) Patent No.: US 10,781,105 B2
(45) Date of Patent: Sep. 22, 2020

(54) METHOD FOR GRAPHENE OXIDE SYNTHESIS

(71) Applicants: Mikhail Aleksandrovich Arkhipov, Moscow (RU); Mukhamed Magomedovich Arsanukaev, Alkhan-Yurt (RU); Sergei Stepanovich Kovalev, Aleksandrov (RU); Vladimir Fedorovich Shitsle, Moscow (RU)

(72) Inventors: Mikhail Aleksandrovich Arkhipov, Moscow (RU); Mukhamed Magomedovich Arsanukaev, Alkhan-Yurt (RU); Aleksandr Ivanovich Motchanyi, Aleksandrov (RU); Sergei Stepanovich Kovalev, Aleksandrov (RU); Vladimir Fedorovich Shitsle, Moscow (RU)

(*) Notice: Subject to any disclaimer, the term of this patent is extended or adjusted under 35 U.S.C. 154(b) by 134 days.

(21) Appl. No.: 16/124,244

(22) Filed: Sep. 7, 2018

(65) Prior Publication Data
US 2020/0024143 A1    Jan. 23, 2020

(30) Foreign Application Priority Data
Jul. 19, 2018 (RU) ................ 2018126661

(51) Int. Cl.
*C01B 32/198* (2017.01)
*B01J 3/00* (2006.01)
*B01J 3/04* (2006.01)
*B82Y 40/00* (2011.01)
*B82Y 30/00* (2011.01)

(52) U.S. Cl.
CPC ............. *C01B 32/198* (2017.08); *B01J 3/008* (2013.01); *B01J 3/04* (2013.01); *B82Y 30/00* (2013.01); *B82Y 40/00* (2013.01)

(58) Field of Classification Search
CPC ........... C01B 32/198; B01J 3/008; B01J 3/04; B82Y 30/00; B82Y 40/00
See application file for complete search history.

(56) References Cited

U.S. PATENT DOCUMENTS 7,105,108 B2    9/2006   Kaschak et al.
9,428,394 B2    8/2016   Tour et al.

FOREIGN PATENT DOCUMENTS

CN    106082195 A  * 11/2016

OTHER PUBLICATIONS

Liu, Botong, et al. "From graphite to graphene oxide and graphene oxide quantum dots." Small 13.18 (2017): 1601001.*

* cited by examiner

*Primary Examiner* — Richard M Rump

(57) ABSTRACT

The invention relates to the field of carbon structure production and, in particular, to a method for synthesis of graphene oxide which is widely used in electronics, medicine, pharmacology and construction industries.

Provided is a method for synthesis of graphene oxide that includes oxidizing ground graphite with sulfuric acid and at least one oxidizer in a medium of supercritical fluid, wherein the method includes providing a mixture of sulfuric acid and dry ice in an amount sufficient for the mixture to solidify, and a mixture of at least one oxidizer and dry ice, wherein at least one of said mixtures contains ground graphite; introducing the provided mixtures into a high pressure autoclave; and further mixing the reagents.

Thus, the claimed invention is a method for synthesis of graphene oxide that allows achieving the technical result consisting in safe production of high quality graphene oxide, wherein the time cost is relatively low and the consumption of sulfuric acid is significantly reduced.

2 Claims, No Drawings

METHOD FOR GRAPHENE OXIDE SYNTHESIS

The invention relates to the field of carbon structure production and, in particular, to a method for synthesis of graphene oxide which is widely used in electronics, medicine, pharmacology and construction industries.

Graphene oxide is $sp^2$ hybridized carbon atoms which form a monolayer or a structure having several layers. Graphene oxide has a high specific active surface formed by the layers of the carbon atoms, wherein said carbon layers have a wide range of oxygen-containing functional groups. By using graphene oxide, various nanostructures can be obtained, for example flexible nanofilms, nanocomposites etc. Graphene oxide is used as an effective sorbent of heavy metal ions and a base for bone tissue regeneration, as well as in drug delivery agents, catalysis, and wound treatment. Furthermore, reduced graphene oxide is obtained from graphene oxide and may be used instead of expensive graphene.

The Hummers method, including its modifications, is the most widely used method for graphene oxide synthesis and is performed by oxidizing graphite with concentrated sulfuric acid with potassium permanganate, wherein, in some cases, sodium nitrate is also used. The main drawbacks of this synthesis method are toxic by-product gases of nitrogen dioxide and nitrogen dioxide dimer when sodium nitrate is used, as well as unreacted and underoxidized graphite. According to an improved method called "the Tour method", graphite is oxidized by interaction of potassium permanganate and a mixture of concentrated sulfuric acid and phosphoric acid. For example, U.S. Pat. No. 9,428,394 with the publication date of Aug. 30, 2016 discloses a method for synthesis of graphene oxide based on the Tour method which provides the complete oxidation of the graphite used, but requires 6 times higher amount of the acids used for oxidizing the graphite than the Hummers method. The above-said method requires a large amount of sulfuric acid to be used as a solvent for the oxidizer, since the manganese (VII) oxide formed after the interaction of the sulfuric acid and the potassium permanganate

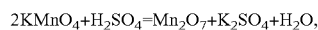

$$2KMnO_4 + H_2SO_4 = Mn_2O_7 + K_2SO_4 + H_2O,$$

should be delivered to each particle of the graphite, wherein the viscosity of suspension increasing significantly during the intercalation of the graphite increases and makes the process of homogeneous mixing difficult. The reduction of the amount of the acid, in turn, may lead to the partial oxidation of the graphite and a higher risk that the decomposition of the manganese (VII) oxide due to insufficient heat removal and a local increase in temperature above 55° C. which is the temperature of spontaneous decomposition of manganese (VII) oxide will cause an explosion.

In the examples, the authors of the invention the above-said patent was granted to, for comparison, also describe the Hummers method and the modified Hummers method as alternative methods for producing graphene oxide which include cooling the mixture of sulfuric acid, graphite and sodium nitrate to 0° C. and gradually adding portions of the ground potassium permanganate, wherein the temperature is kept below 20° C. to prevent overheating.

The drawback of the above-mentioned alternative methods is that the obtained graphite is underoxidized and of black color which limits its application range, wherein toxic gases of nitrogen dioxide and nitrogen dioxide dimer are formed.

The closest technical solution that is taken as the prototype is a method for modifying graphite disclosed in the U.S. Pat. No. 7,105,108 with the publication date of Sep. 12, 2006, and the method includes introducing an intercalating agent with an oxidizer into a graphite flake in a medium of a supercritical fluid. The document describes that introducing the intercalating agent is performed in a high pressure vessel, wherein carbon dioxide is used as the supercritical medium. The document doesn't disclose how the heat is removed from the oxidation reaction zone, as well as how the explosive mixture of the reagents can be introduced into the pressure vessel.

The object of the present invention is to provide a method for synthesis of graphene oxide that would allow achieving the technical result consisting in safe production of high quality graphene oxide, wherein the time cost is relatively low and the consumption of sulfuric acid is significantly reduced.

This object is achieved by providing a method for synthesis of graphene oxide that includes oxidizing ground graphite with sulfuric acid and at least one oxidizer in a medium of supercritical fluid, wherein the method includes providing a mixture of sulfuric acid and dry ice in an amount sufficient for the mixture to solidify, and a mixture of at least one oxidizer and dry ice, wherein at least one of said mixtures contains ground graphite; introducing the provided mixtures into a high pressure autoclave; and further mixing the reagents.

Due to providing a mixture of initial components and dry ice immediately prior to their introducing into an autoclave, the solution according to the claimed synthesis method provides solidification of sulfuric acid and prevents the reaction of the sulfuric acid and an oxidizer, thus allowing the technical result consisting in safe introduction of reagents into an autoclave to be achieved. According to the present invention, the autoclave is used as a reactor in which the intercalation and oxidation of the graphite, as well as the transition of the dry ice, i.e. solid carbon dioxide, into the supercritical state take place. Thus, the particles of the dry ice which are in the autoclave serve as a cooling agent as they remove heat from the reagents in the oxidation reaction zone, and are used to form the supercritical fluid as a solvent required to deliver the oxidizer to the graphite. Accordingly, the sulfuric acid as a solvent may be partially substituted with carbon dioxide, thus significantly reducing the consumption of the sulfuric acid and facilitating the utilization of the solvent. The preliminary mixing of the initial components and dry ice provides continuous supply of fresh particles of the reagents into the reaction zone while the dry ice is being sublimated. According to the claimed method, the duration of synthesis is approximately 4 hours, wherein the obtained graphene oxide has high oxidation degree, so the content of oxygen-containing functional groups is high. The claimed method allows producing graphene oxide of high quality within a relatively short period of time, wherein the consumption of the sulfuric acid is significantly reduced.

The most preferred ways of preparing the initial reagents to be introduced into the autoclave are as follow: mixing sulfuric acid and dry ice in an amount sufficient for the mixture to solidify and mixing graphite with at least one oxidizer and dry ice; or mixing graphite with sulfuric acid and dry ice in an amount sufficient for the mixture to solidify, and mixing at least one oxidizer and dry ice. Any of the mentioned ways allows the claimed technical result to be achieved.

The introduction of the mixture of sulfuric acid and dry ice into the autoclave may be completely performed at a time, i.e. in one step, or may be performed partially and alternate with the introduction of the other initial components, which is the most preferred way since the mixing of sulfuric acid and oxidizer is quick and complete, wherein the autoclave is also rotated due to the increased (in comparison with the one step introduction of sulfuric acid) contact area of the solidified sulfuric acid and the oxidant. The intercalated oxidized graphite formed at the start of the oxidation while the dry ice is sublimating may mechanically prevent the further mixing of the reagents and the subsequent complete synthesis, so it is reasonable to introduce the sulfuric acid into the autoclave in two or more steps.

Of course, the reaction should be performed under conditions which facilitate the formation and presence of the supercritical fluid. The conditions that carbon dioxide can withstand in the supercritical state are specific temperature and pressure, i.e. a temperature above 31° C., and pressure above 74 bars.

Preferably, particles of dry ice the size of which is 1-5 mm are used, so the reagents are mixed well and, thus, highly uniform.

Preferably, the autoclave is rotated and shaken to facilitate the mixing, so that the whole mixture is subjected to the reaction.

The oxidizer used in the synthesis may be at least one. Thus, the claimed method for synthesis is not limited to the use of only one oxidizer, so it is also possible to use several suitable oxidizers. According to a preferred embodiment of the present invention, potassium permanganate is used as the oxidizer. However, it should be noted that manganese (VII) oxide is an unstable compound and explodes at a temperature above 55° C. Thus, in the embodiment of the present invention, heating the outer walls of the autoclave in a temperature range of 35-50° C. is most preferred. Said temperature provides the transition and presence of carbon dioxide in the supercritical state and doesn't allow the manganese (VII) oxide to explode.

Below, specific examples of the method for synthesis of graphene oxide according to the preferred embodiments of the present invention are disclosed.

EXAMPLE 1

Method for synthesis graphene oxide, wherein a mixture of sulfuric acid and dry ice in an amount sufficient for the mixture to solidify and a mixture of graphite with an oxidizer and dry ice are used as reagents.

75 ml of concentrated sulfuric acid are mixed with 90 g of dry ice with a particle size of 1-5 mm; the solidified mixture is introduced into a 500 ml autoclave made of stainless steel 316L. Then a mixture of 12 g of ground natural graphite (the particle size is $D_{50}=15$ μm and $D_{95}=70$ μm), 72 g of potassium permanganate and 150 g of dry ice with a particle size of 1-5 mm is introduced into the autoclave. Finally, 75 ml of concentrated sulfuric acid are mixed with 90 g of dry ice with a particle size of 1-5 mm, and the solidified mixture is introduced into the autoclave. The autoclave is closed and sealed. The autoclave is fixed on a shaker and rotated for 3 hours at 12 rpm. With the beginning of the rotation, hot air is blown onto the outer surface of the walls of the autoclave. The temperature of the outer walls of the autoclave reaches 40° C. within 1.5 hours and is kept the same until the rotation is stopped. Then, the autoclave is horizontally placed and fixed on a shaking table, and subjected to vibration of 50 Hz frequency and 2 mm amplitude for 1 hour, wherein the temperature of the outer walls of the autoclave is kept to be approximately 40° C. Then, the pressure in the autoclave is slowly reduced by releasing the carbon dioxide through a tank with water.

Then, the autoclave is opened, and the intercalated graphite is discharged. The amount of the discharged intercalated graphite is 330 g.

The obtained material is mixed with 2 l of water in a magnetic stirrer. Then, 100 g of oxalic acid dihydrate is introduced into the suspension with portions of 10 g during the mixing, wherein the suspension changes its color from violet to yellow. Then, the suspension is subjected to ultrasonic treatment with a 100 W ultrasonic wave source for 15 min in a bath.

Then, the suspension is transferred to 8 dialysis bags made of PTFE with a pore size of 0.6 μm; the bags are placed in a 24 l tank with water on a magnetic stirrer. The mixing is stopped after 24 hours when the pH-value outside and inside of the bags is 1. Then, the material is transferred from the 8 dialysis bags to a polyethylene bag, 170 ml of 30% hydrochloric acid is added to the package, and ultrasonic treatment is performed for 15 minutes in the above mentioned bath. Thereafter, the material is transferred into 8 new dialysis bags that are placed in the 24 l tank with water, and is mixed with the magnetic stirrer for 24 hours. The dialysis bags are fixed on the tank with water in such a way that the level of the suspension in the dialysis bags is higher than the level of the water in the tank. The liquid passes through the walls of the bags, and the level difference disappears during the dialysis. The mount of the suspension after the dialysis approximately corresponds to the amount of the suspension before the 30% hydrochloric acid was added. The initial level difference is required to keep the concentration of the graphene oxide in the water suspension high after the addition of 30% hydrochloric acid and the dialysis. The procedure including addition of 170 ml of 30% hydrochloric acid and ultrasonic treatment for 15 min followed by 24-hour dialysis (this time period is required for the pH-values inside and outside of the dialysis bags to become equal) in new bags and with new water in the tank is repeated 5 times. Then, a similar dialysis process is repeated 6 times without adding 30% hydrochloric acid. Thus, 2.3 l of a brown suspension of graphene oxide with pH=7.0 are obtained. Then, 20 ml of the suspension are mixed with 40 ml of water in a polyethylene bag placed in an ultrasonic bath for 15 min. The obtained diluted suspension in the amount of 0.1 ml is applied over a rotating substrate of polished silicon, wherein the rotation speed is 6000 rpm, and dried; then the following is determined with an atomic-force microscope: the length and width of the flakes of 1-2 graphene oxide layers are 0.5-30 μm. Furthermore, 0.3 ml of the diluted suspension is applied over a substrate of polished silicon that doesn't rotate; the suspension is dried and studied using energy-dispersive X-ray spectroscopy.

Except for carbon, oxygen, and silicon (the substrate), there are no other elements detected.

The diluted and concentrated suspensions of graphene oxide are stable, and there was no residue detected during the storage for one month. The concentrated suspension is subjected to freeze drying after which 15.2 g of powdered graphene oxide are obtained. The obtained graphene oxide is studied using X-ray photoelectron spectroscopy to determine the oxygen content. The oxygen content in the graphene oxide is 42 wt. %.

EXAMPLE 2

Method for synthesis of graphene oxide, wherein a mixture of sulfuric acid with graphite and dry ice in an amount sufficient for the mixture to solidify and a mixture of oxidizer and dry ice are used as reagents.

75 ml of concentrated sulfuric acid are mixed with 6 g of ground natural graphite (the particle size is $D_{50}$=15 μm and $D_{95}$=70 μm); the obtained mixture is mixed with 90 g of dry ice with a particle size of 1-5 mm; the solidified mixture is introduced into a 500 ml autoclave made of stainless steel 316L. Then, a mixture of 72 g of potassium permanganate and 150 g of dry ice with a particle size of 1-5 mm is introduced into the autoclave. Finally, 75 ml of concentrated sulfuric acid are mixed with 6 g of ground natural graphite (particle size is $D_{50}$=15 μm and $D_{95}$=70 μm); the obtained mixture is mixed with 90 g of dry ice with a particle size of 1-5 mm, and the solidified mixture is introduced into the autoclave. The autoclave is closed and sealed. The autoclave is fixed on a shaker and rotated for 3 hours at 12 rpm. With the beginning of the rotation, hot air is blown onto the outer surface of the walls of the autoclave. The temperature of the outer walls of the autoclave reaches 40° C. within 1.5 hours and is kept the same until the rotation is stopped. Then, the autoclave is horizontally placed and fixed on a shaking table, and subjected to vibration of 50 Hz frequency and 2 mm amplitude for 1 hour, wherein the temperature of the outer walls of the autoclave is kept to be approximately 40° C. Then, the pressure in the autoclave is slowly reduced by releasing the carbon dioxide through a tank with water. The autoclave is opened, and the intercalated graphite is discharged. The amount of the discharged intercalated graphite is 330 g.

The obtained material is mixed with 2 l of water in a magnetic stirrer. Then, 100 g of oxalic acid dihydrate is introduced into the suspension with portions of 10 g during the mixing, wherein the suspension changes its color from violet to yellow. Then, the suspension is subjected to ultrasonic treatment with a 100 W ultrasonic wave source for 15 min in a bath.

Then, the suspension is transferred to 8 dialysis bags made of PTFE with a pore size of 0.6 μm; the bags are placed in a 24 l tank with water on a magnetic stirrer. The mixing is stopped after 24 hours when the pH-value outside and inside of the bags is 1. Then, the material is transferred from the 8 dialysis bags to a polyethylene bag, 170 ml of 30% hydrochloric acid is added to the package, and ultrasonic treatment is performed for 15 minutes in the above mentioned bath. Thereafter, the material is transferred into 8 new dialysis bags that are placed in the 24 l tank with water, and is mixed with the magnetic stirrer for 24 hours. The dialysis bags are fixed on the tank with water in such a way that the level of the suspension in the dialysis bags is higher than the level of the water in the tank. The liquid passes through the walls of the bags, and the level difference disappears during the dialysis. The mount of the suspension after the dialysis approximately corresponds to the amount of the suspension before the 30% hydrochloric acid was added. The initial level difference is required to keep the concentration of the graphene oxide in the water suspension high after the addition of 30% hydrochloric acid and the dialysis. The procedure including addition of 170 ml of 30% hydrochloric acid and ultrasonic treatment for 15 min followed by 24-hour dialysis (this time period is required for the pH-values inside and outside of the dialysis bags to become equal) in new bags and with new water in the tank is repeated 5 times. Then, a similar dialysis process is repeated 6 times without adding 30% hydrochloric acid. Thus, 2.3 l of a brown suspension of graphene oxide with pH=7.0 are obtained. Then, 20 ml of the suspension are mixed with 40 ml of water in a polyethylene bag placed in an ultrasonic bath for 15 min. The obtained diluted suspension in the amount of 0.1 ml is applied over a rotating substrate of polished silicon, wherein the rotation speed is 6000 rpm, and dried; then the following is determined with an atomic-force microscope: the length and width of the flakes of 1-2 graphene oxide layers are 0.5-30 μm. Furthermore, 0.3 ml of the diluted suspension is applied over a substrate of polished silicon that doesn't rotate; the suspension is dried and studied using energy-dispersive X-ray spectroscopy: except for carbon, oxygen, and silicon (the substrate), there are no other elements detected. The diluted and concentrated suspensions of graphene oxide are stable, and there was no residue detected during the storage for one month. The concentrated suspension is subjected to freeze drying after which 15.0 g of powdered graphene oxide are obtained. The obtained graphene oxide is studied using X-ray photoelectron spectroscopy to determine the oxygen content. The oxygen content in the graphene oxide is 40 wt. %.

The examples disclosed above include not only the description of the steps of the method according to the present invention, but also describe the processes of the washing and dialysis.

The graphene oxide obtained in the above examples has high oxidation degree; the method doesn't require high temperatures to be used, and the duration of the synthesis cycle is approximately 4 hours; furthermore, toxic nitrogen oxides don't form during the synthesis.

Thus, the claimed invention is a method for synthesis of graphene oxide that allows achieving the technical result consisting in safe production of high quality graphene oxide, wherein the time cost is relatively low and the consumption of sulfuric acid is significantly reduced.

The invention claimed is:

1. A method for synthesis of graphene oxide by oxidizing ground graphite using sulfuric acid and at least potassium permanganate in a medium of supercritical fluid of carbon dioxide, the method comprising
    obtaining a mixture of sulfuric acid and dry ice in an amount sufficient for the mixture to be solidified, and a mixture of at least potassium permanganate and dry ice, wherein at least one of said mixtures contains ground graphite;
    with charging of the obtained mixtures into a high pressure autoclave, and further mixing of the reagents,
    wherein an outer wall of the high pressure autoclave is heated to a temperature between 35° C. to 50° C.

2. The method according to claim 1, wherein the mixing of the reagents in the high pressure autoclave is performed by rotating and shaking of the high pressure autoclave.

* * * * *